(12) United States Patent
Raman

(10) Patent No.: US 11,745,663 B1
(45) Date of Patent: Sep. 5, 2023

(54) FRONT-VIEW SYSTEM AND FRONT-VIEW METHOD USING THE SAME

(71) Applicants: HYUNDAI MOTOR COMPANY, Seoul (KR); Kia Corporation, Seoul (KR)

(72) Inventor: Shyam Raman, Tamil Nadu (IN)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/870,216

(22) Filed: Jul. 21, 2022

(30) Foreign Application Priority Data

Apr. 11, 2022 (IN) .............................. 202211021512

(51) Int. Cl.
*B60R 1/12* (2006.01)
*B60W 50/14* (2020.01)

(52) U.S. Cl.
CPC ............... *B60R 1/12* (2013.01); *B60W 50/14* (2013.01); *B60R 2001/1253* (2013.01); *B60W 2050/146* (2013.01)

(58) Field of Classification Search
CPC .. B60R 1/12; B60R 2001/1253; B60W 50/14; B60W 2050/146
See application file for complete search history.

(56) References Cited

U.S. PATENT DOCUMENTS

| | | | | |
|---|---|---|---|---|
| 6,313,454 B1* | 11/2001 | Bos | ....................... | G06V 20/56 250/208.1 |
| 6,320,176 B1* | 11/2001 | Schofield | ............... | H04N 7/181 348/E7.086 |
| 6,353,392 B1* | 3/2002 | Schofield | ............. | B60S 1/0888 340/602 |
| 2015/0042806 A1* | 2/2015 | Wierich | .................. | G06T 5/002 348/148 |

* cited by examiner

*Primary Examiner* — Thomas M Sember
(74) *Attorney, Agent, or Firm* — MORGAN, LEWIS & BOCKIUS LLP

(57) ABSTRACT

A front-view system is disclosed. The front-view system may include: a detector configured to detect whether a forward vision of a driver is obstructed; a front camera configured to capture a front view of a vehicle and transmit an image of the captured front view of the vehicle; at least one display mounted in the vehicle; and a controller configured to receive the image of the captured front view of the vehicle from the front camera in response to receiving information indicating that the forward vision of the driver is obstructed, and display the received image of the front view of the vehicle on the at least one display. A front-view method using the front-view system is further disclosed.

11 Claims, 7 Drawing Sheets

FRONT-VIEW SYSTEM AND FRONT-VIEW METHOD USING THE SAME

CROSS-REFERENCE TO RELATED APPLICATION

The present application claims priority to Indian Patent Application No. 202211021512 filed in the Indian Intellectual Property Office on Apr. 11, 2022, the entire contents of which is incorporated herein for all purposes by this reference.

BACKGROUND OF THE PRESENT DISCLOSURE

Field of the Present Disclosure

The present disclosure relates to a front-view system and a front-view method using the same, and more particularly, to a front-view system and a front-view method using the same which enables a driver to check a front view of a vehicle even when a forward vision of a driver is obstructed due to sunlight, high beam of a vehicle traveling on an opposite lane, light reflected from a crash pad, or heavy rain.

Description of Related Art

A driver obtains information necessary for driving by looking at a front of a vehicle through a front window of the vehicle. For example, a driver can obtain information on whether a preceding vehicle exists, whether a preceding vehicle is braking, whether a curved road exists in front of a vehicle, or whether front lanes are reduced by looking at a front of a vehicle through a front window of the vehicle.

However, a forward vision of a driver may be obstructed by sunlight from the sun positioned in the driver's line of sight, high beams from a vehicle traveling on an opposite lane, strong light reflected from a crash pad, or heavy rain. Thus, it may be difficult to obtain information necessary for driving. Such a situation may cause an accident, which may result in personal and property damage.

On the other hand, some vehicles are provided with a front camera that secures a front image, but the front camera is manually operated or turned off. Therefore, if a situation that obstructs a forward vision of a driver suddenly occurs while driving with the front camera turned off, the driver must operate the front camera manually, which can distract the driver's attention.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a front-view system and a front-view method using the same having advantages of automatically displaying a front image of a vehicle on a display within the vehicle when a situation that obstructs a front view of a driver occurs so that the driver can check the front of the vehicle.

A front-view system according to various exemplary embodiments of the present disclosure may include: a detector configured to detect whether a forward vision of a driver is obstructed; a front camera configured to capture a front view of a vehicle and transmit an image of the captured front view of the vehicle; at least one display mounted in the vehicle; and a controller configured to receive the image of the captured front view of the vehicle from the front camera in response to receiving information indicating that the forward vision of the driver is obstructed, and display the received image of the front view of the vehicle on the at least one display.

The detector may be a photoelectric color detector or a rainfall detector.

The at least one display may be provided in at least one of a front window, a rear-view mirror, and an instrument panel of the vehicle.

The information indicating that the forward vision of the driver is obstructed may be transmitted to the controller through a transmitter.

A front-view method according to various exemplary embodiments of the present disclosure may be executed by a controller. The front-view method may include: determining whether a forward vision of a driver is obstructed; receiving an image of a front view of a vehicle by operating a front camera in response to receiving information indicating that the forward vision of the driver is obstructed; and displaying the received image of the front view of the vehicle on at least one display.

Whether the forward vision of the driver is obstructed may be determined based on information on whether the forward vision of the driver is obstructed detected by a detector.

The detector may be a photoelectric color detector or a rainfall detector.

The at least one display may be provided in at least one of a front window, a rear-view mirror, and an instrument panel of the vehicle.

The information on whether the forward vision of the driver is obstructed may be transmitted to the controller through a transmitter.

According to an exemplary embodiment of the present disclosure, when a situation that obstructs a front view of a driver occurs due to sunlight from the sun positioned in a driver's line of sight, high beams from a vehicle traveling on an opposite lane, strong light reflected from a crash pad, or heavy rain, the present situation is detected and a front image of a vehicle is automatically displayed on a display within the vehicle so that a driver can see a front of the vehicle. Accordingly, it is possible to reduce risk of an accident while driving the vehicle and to help comfortable driving.

Furthermore, the effects obtainable or predicted by the exemplary embodiment of the present disclosure will be disclosed directly or implicitly in the detailed description of the exemplary embodiment of the present disclosure. That is, various effects predicted according to the exemplary embodiment of the present disclosure will be disclosed in the detailed description which is to be provided below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
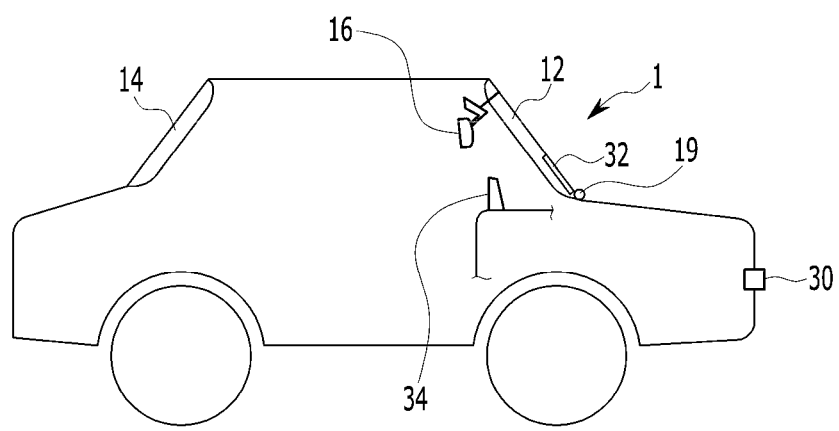
FIG. 1 is a diagram schematically illustrating a vehicle to which a front-view system according to various exemplary embodiments of the present disclosure is applicable.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The terminology used herein is for describing various exemplary embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in the exemplary embodiment, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "car," or other similar term as used herein is inclusive of motor vehicles, in general, such as passenger vehicles including sports utility vehicles (SUVs), buses, trucks, various commercial vehicles, watercraft including a variety of boats and ships, aircraft, and the like.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may be configured to control operation of units, modules, parts, devices, or the like, as described herein. Moreover, it is understood that the below methods may be executed by an apparatus including the controller in conjunction with one or more other components, as would be appreciated by a person of ordinary skill in the art.

Furthermore, the controller of the present disclosure may be embodied as non-transitory computer readable media including executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

A front-view system according to various exemplary embodiments of the present disclosure is configured to automatically operate a front camera to automatically display a front image obtained by the front camera on a display within a vehicle when it is detected by a detector mounted in the vehicle that a situation that obstructs a forward vision of a driver occurs.

A front-view system and a front-view method using the same according to various exemplary embodiments of the present disclosure will hereinafter be described in detail with reference to the accompanying drawings.

Figure 2:
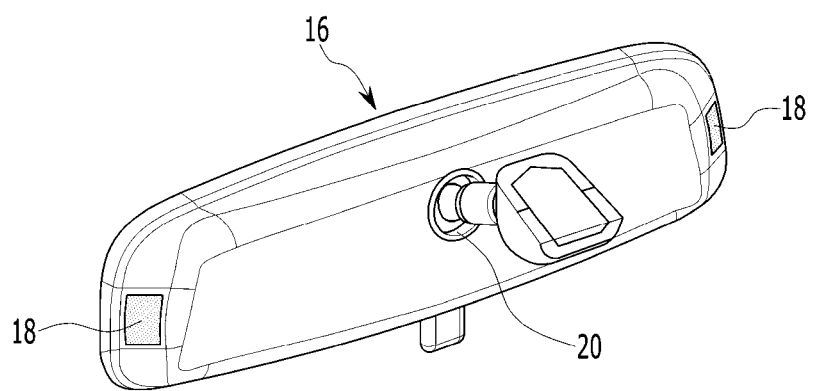
FIG. 2 is a diagram illustrating a mount position of a photoelectric color detector used in a front-view system according to various exemplary embodiments of the present disclosure.
Figure 3:
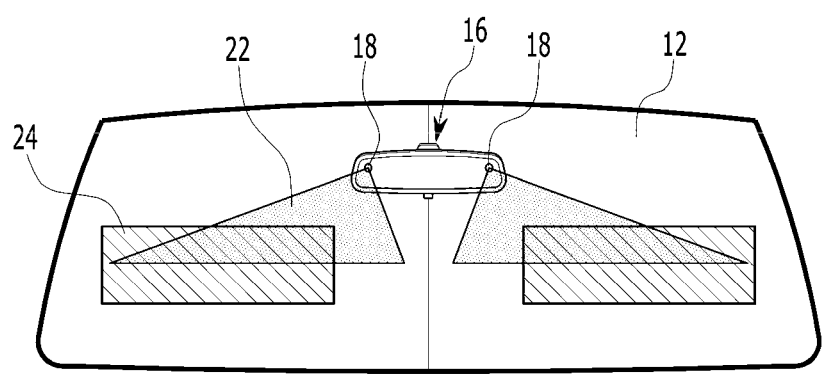
FIG. 3 is a diagram schematically illustrating a light emission region where a photoelectric color detector emits light and a vision region of a driver.
Figure 4:
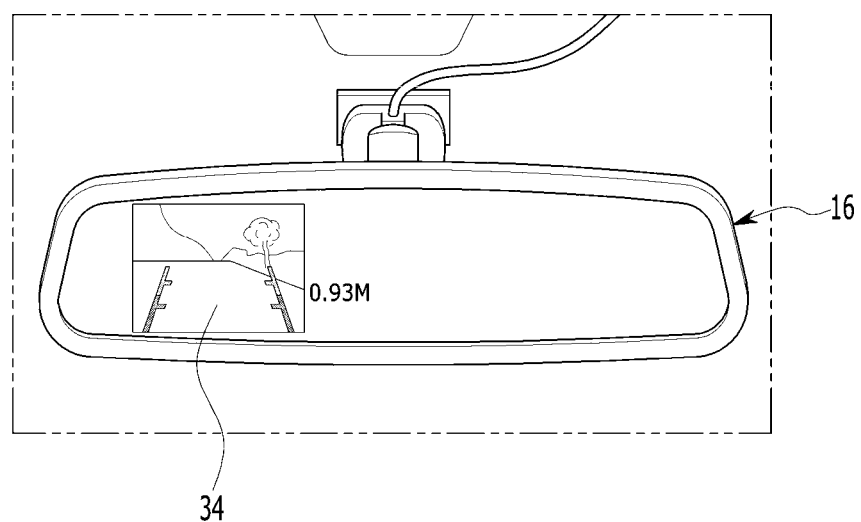
FIG. 4 is a diagram illustrating one example of a rear-view mirror of a vehicle.
Figure 5:
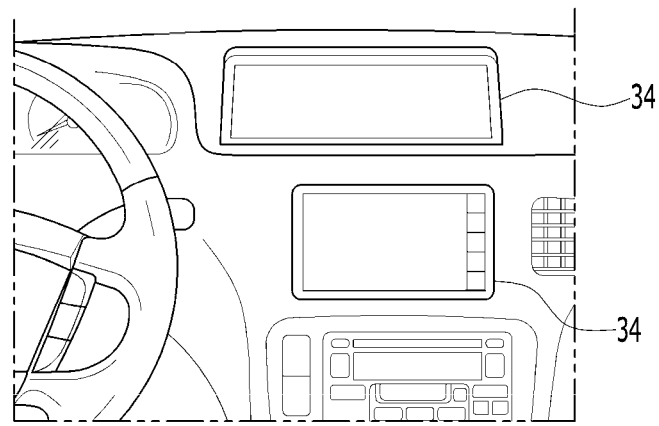
FIG. 5 is a diagram illustrating one example of an instrument panel of a vehicle.

FIG. 1 is a diagram schematically illustrating a vehicle to which a front-view system according to various exemplary embodiments of the present disclosure is applicable; FIG. 2 is a diagram illustrating a mount position of a photoelectric color detector used in a front-view system according to various exemplary embodiments of the present disclosure; FIG. 3 is a diagram schematically illustrating a light emission region where a photoelectric color detector emits light and a vision region of a driver; FIG. 4 is a diagram illustrating one example of a rear-view mirror of a vehicle; and FIG. 5 is a diagram illustrating one example of an instrument panel of a vehicle.

As shown in FIG. 1, a front-view system according to various exemplary embodiments of the present disclosure is applied to a vehicle 1. A type of the vehicle 1 is not specifically limited, and may be a vehicle 1 provided with a front camera 30 that obtains a front image of the vehicle 1.

A front window 12 is mounted at a front portion of the vehicle 1 and a rear window 14 is mounted at a rear portion of the vehicle 1. A driver can see a front view of the vehicle 1 through the front window 12. That is, a light signal corresponding to the front view of the vehicle 1 is incident to eyes of the driver through the front window 14 so that the driver can see the front view of the vehicle 1. However, if sunlight, high beams of a vehicle traveling on an opposite lane, or a strong light reflected from a surface of vehicle parts such as crash pads are shining on a vision region of the driver 24 (see FIG. 3), or if the front window 12 is blurred due to heavy rain or dew or fog condensing on the front window 12, it may be difficult for the driver to see the front view of the vehicle 1 through the front window 12.

A predetermined position of the front window 12 functions as a head-up display 32 to display information required by a driver or predetermined information. Furthermore, a rainfall detector 19 may be mounted at the front window 12 or the front portion of the vehicle 1. The rainfall detector 19 can detect whether it rains or dew or fog is condensed on the front window 12 by detecting a transmittance, a refractive index, a reflectance, etc. of light in the front window 12, and accordingly can detect whether a forward vision of the driver is obstructed.

A rear-view mirror 16 is mounted within the vehicle 1 at the rear of the front window 12, so that the driver can see a rear view of the vehicle 1 through the rear-view mirror 16. That is, a light signal corresponding to the rear view of the vehicle 1 is incident to the rear-view mirror 16 through the rear window 14, and then is reflected from the rear-view mirror 16 to be incident to the eyes of the driver. Accordingly, the driver can see the rear view of the vehicle 1 through the rear-view mirror 16.

As shown in FIG. 2, a photoelectric color detector 18 is mounted at a side portion of a front surface (a surface facing the front window 12) of the rear-view mirror 16. The photoelectric color detector 18 may be mounted at the side portion of the front surface of the rear-view mirror 16 corresponding to the driver's seat position according to laws of each country. For example, in Korea where the driver's seat is located on the left side, the photoelectric color detector 18 is mounted on the left side of the front surface of the rear-view mirror 16.

As shown in FIG. 3, the photoelectric color detector 18 emits light including R, G, and B toward the front window 12, receives the light reflected from the front window 12, and detects whether there are factors that obstruct the forward vision of the driver at the front window 12 to which the light is emitted. The photoelectric color detector 18 emits the light including R, G, and B to the light emission region 22, and the light emission region 22 overlaps with the vision region 24 of the driver at least at the front window 12. Here, relative ratios of R, G, and B included in the light emitted from the photoelectric color detector 18 are preset. The light emitted from the photoelectric color detector 18 to the light emission region 22 is reflected at the front window 12, at the vision region 24 of the driver, and the photoelectric color detector 18 receives the reflected light to detect the relative ratios of R, G, and B. If there are factors that obstruct the forward vision of the driver at the vision region 24 of the driver, the relative ratios of R, G, and B of the reflected light is changed from the relative ratio of R, G, and B of the emitted light by more than predetermined ratios. On the other hand, if there are no factors that obstruct the forward vision of the driver at the vision region 24 of the driver, the relative ratios of R, G, and B of the reflected light is hardly changed from the relative ratios of R, G, and B of the emitted light. Because the photoelectric color detector 18 compares the relative ratios of R, G, and B of the emitted light with the relative ratios of R, G, and B of the reflected light, it may be detected whether there are factors that obstruct the forward vision of the driver at the vision region 24 of the driver.

In an exemplary embodiment of the present invention, when a controller 40 (see FIG. 6) determines that difference between the relative ratios of R, G, and B of the emitted light and the relative ratios of R, G, and B of the reflected light is higher than a predetermined value, the controller 40 concludes that there are factors that obstruct the forward vision of the driver at the vision region 24 of the driver.

On the other hand, the vision region 24 of the driver is dependent on the position of the driver's seat. Therefore, the photoelectric color detector 18 is mounted at the side portion of the front surface of the rear-view mirror 16 corresponding to the driver's seat position according to the laws of each country to emit the light to the vision region 24 of the driver corresponding to the driver's position.

Referring to FIG. 2 again, the rear-view mirror 16 is further provided with a transmitter 20. The transmitter 20 is electrically or communicatively connected to the photoelectric color detector 18 to receive the information detected by the photoelectric color detector 18 and transmits the information to a controller 40 (see FIG. 6). That is, the transmitter 20 receives the information from the photoelectric color detector 18 on whether or not there are factors that may obstruct the forward vision of the driver 24 at the vision region 24 of the driver, and transmits the received information to the controller 40.

As shown in FIG. 4, a display 34 may be provided at any position of the rear-view mirror 16. The information required by the driver or the predetermined information may be displayed on the display 34 provided on the rear-view mirror 16.

An instrument panel is provided at the front side of vehicle 1. As shown in FIG. 5, the display 34 is embedded in the instrument panel or mounted on the instrument panel, so that the information requested by the driver or the predetermined information may be displayed on the display 34.

Herein, the example in which the front window 12 functions as the head up display 32, and the display 34 is mounted to the rear-view mirror 16 and/or the instrument panel is illustrated. However, the displays 32 and 34 may be mounted to at least one of the front window 12, the rear-view mirror 16, and the instrument panel. Additionally, the displays 32 and 34 may also be provided in other positions within the vehicle 1 where the driver can see without distraction.

The front camera 30 is provided on a front side of the vehicle 1 and can capture the front view of the vehicle 1.

Figure 6:
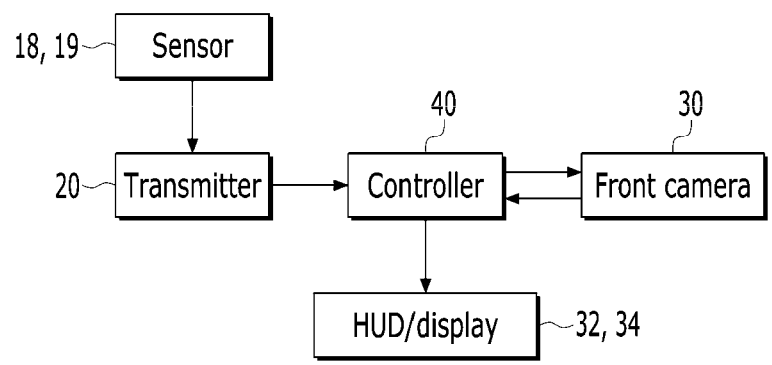
FIG. 6 is a block diagram of a front-view system according to various exemplary embodiments of the present disclosure.

FIG. 6 is a block diagram of a front-view system according to various exemplary embodiments of the present disclosure.

As shown in FIG. 6, the front-view system according to the exemplary embodiment of the present disclosure may include the at least one detector 18 and 19, the transmitter 20, the controller 40, the front camera 30, and the at least one display 32 and 34.

The at least one detector 18 and 19 includes at least one of the photoelectric color detector 18 and the rainfall detector 19. The photoelectric color detector 18 is configured to compare the relative ratios of R, G, and B of the emitted light with the relative ratios of R, G, and B of the reflected light to detect whether there are factors that obstruct the forward vision of the driver at the vision region 24 of the driver, and to transmit the information corresponding thereto to the transmitter 20. The rainfall detector 19 is configured to detect whether the forward vision of the driver is obstructed by detecting whether it rains or dew or fog is condensed on the front window 12, and to transmit the information corresponding thereto to the transmitter 20. In the exemplary embodiment, it is exemplified that the photoelectric color detector 18 and the rainfall detector 19 transmit the detected information to the transmitter 20, but the photoelectric color detector 18 and/or the rainfall detector 19 can directly transmit the detected information to the controller 40.

The transmitter 20 is mounted on the rear-view mirror 16 and is configured to receive the information from the photoelectric color detector 18 and/or the rainfall detector 19 on whether there are factors that obstruct the forward vision of the driver, and to transmit the received information to the controller 40.

The controller 40 receives the information from the transmitter 20 on whether there are factors that obstruct the forward vision of the driver. When receiving the information that there are factors that obstruct the forward vision of the driver, the controller 40 controls the front camera 30 to capture the front view of the vehicle 1 and transmit the captured image of the front view of the vehicle 1 to the controller 40. Furthermore, the controller 40 displays the image received from the front camera 30 on at least one of the displays 32 and 34 within the vehicle 1. Therefore, the driver can see the front view of the vehicle 1 by looking at the images displayed on the displays 32 and 34. Because the displays 32 and 34 are positioned where the driver can easily check the images without distraction, the driver can easily check the front view of the vehicle 1, reducing the risk of accidents and helping comfortable driving.

Figure 7:
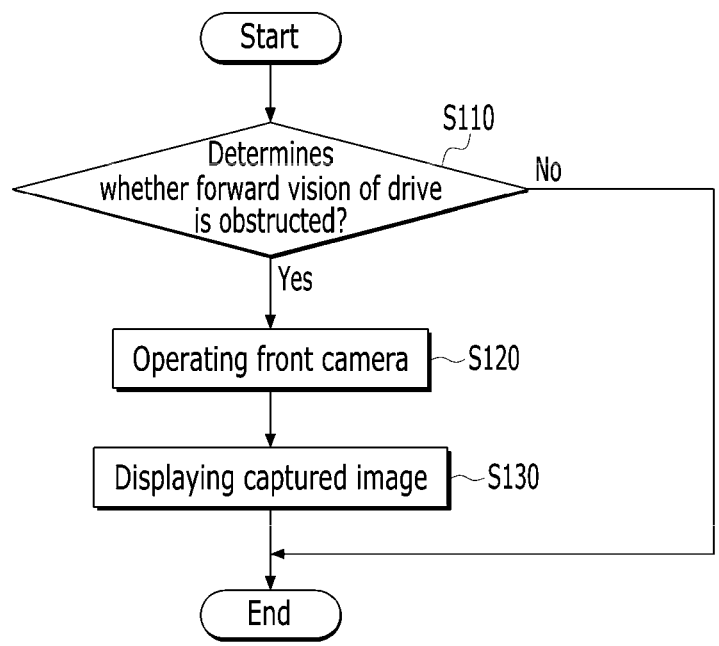
FIG. 7 is a flowchart of a front-view method according to various exemplary embodiments of the present disclosure.

FIG. 7 is a flowchart of a front-view method according to various exemplary embodiments of the present disclosure.

As shown in FIG. 7, the controller 40 determines whether the forward vision of the driver is obstructed based on the information detected by the detectors 18 and 19 while driving the vehicle 1 at step S110. That is, the photoelectric color detector 18 emits the light to the vision region 24 of the driver and receives the reflected light from the vision region 24 to determine whether there are factors which may obstruct the forward vision of the driver 24 at the vision region 24 of the driver. Furthermore, the rainfall detector 19 detects whether the forward vision of the driver is obstructed by detecting whether it rains or dew or fog is condensed on the front window 12. The information on whether there are factors that obstructs the forward vision of the driver detected by the photoelectric color detector 18 and/or the rainfall detector 19 is transmitted to the controller 40 directly or through the transmitter 20, and the controller 40 determines whether the forward vision of the driver is obstructed based on the information.

If it is determined that the forward vision of the driver is not obstructed, the controller 40 terminates the method according to the exemplary embodiment of the present disclosure. If it is determined that the forward vision of the driver is obstructed, the controller 40 operates the front camera 30 at step S120 to capture the front view of the vehicle 1 and controls the front camera 30 to transmit the captured image of the front view of the vehicle 1 to the controller 40.

After that, the controller 40 displays the image transmitted from the front camera 30 on the at least one display 32 and 34 within the vehicle 1 at step S130. Therefore, the driver can check the front view of the vehicle 1 displayed on the displays 32 and 34.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A front-view system, comprising:
a detector configured to detect whether a forward vision of a driver is obstructed;
a front camera configured to capture a front view of a vehicle and transmit an image of the captured front view of the vehicle;
at least one display mounted in the vehicle; and
a controller configured to receive the image of the captured front view of the vehicle from the front camera in response to receiving information indicating that the forward vision of the driver is obstructed, and configured to display the received image of the front view of the vehicle on the at least one display,
wherein the detector is a photoelectric color detector, and
wherein when light emitted from the photoelectric color detector to a light emission region is reflected at a front window of the vehicle at a vision region of the driver, the photoelectric color detector receives the reflected light.

2. The front-view system of claim 1, wherein the detector further includes a rainfall detector which is configured to detect whether it rains or dew or fog is condensed on the front window of the vehicle.

3. The front-view system of claim 1, wherein when the controller determines that a difference between relative ratios of R, G, and B of the emitted light and relative ratios of R, G, and B of the reflected light is higher than a predetermined value, the controller concludes that there are factors that obstruct the forward vision of the driver at the vision region of the driver.

4. The front-view system of claim 1, wherein the at least one display is provided in at least one of the front window, a rear-view mirror, and an instrument panel of the vehicle.

5. The front-view system of claim 1, wherein the information indicating that the forward vision of the driver is obstructed is transmitted to the controller through a transmitter.

6. A front-view method, comprising:
determining, by a controller via a detector, whether a forward vision of a driver is obstructed;
receiving, by the controller, an image of a front view of a vehicle by operating a front camera in response to receiving information indicating that the forward vision of the driver is obstructed; and
displaying, by the controller, the received image of the front view of the vehicle on at least one display,
wherein the detector is a photoelectric color detector, and
wherein when light emitted from the photoelectric color detector to a light emission region is reflected at a front window of the vehicle at a vision region of the driver, the photoelectric color detector receives the reflected light.

7. The front-view method of claim 6, wherein the controller is configured to determine that the forward vision of the driver is obstructed based on information on whether the forward vision of the driver is obstructed, received from the detector.

8. The front-view method of claim 6, wherein the detector further includes a rainfall detector which is configured to detect whether it rains or dew or fog is condensed on the front window of the vehicle.

9. The front-view method of claim 6, wherein when the controller determines that a difference between relative ratios of R, G, and B of the emitted light and relative ratios of R, G, and B of the reflected light is higher than a predetermined value, the controller concludes that there are factors that obstruct the forward vision of the driver at the vision region of the driver.

10. The front-view method of claim 6, wherein the at least one display is provided in at least one of the front window, a rear-view mirror, and an instrument panel of the vehicle.

11. The front-view method of claim 6, wherein the information on whether the forward vision of the driver is obstructed is transmitted to the controller through a transmitter.

* * * * *